United States Patent [19]
Nagahara et al.

[11] Patent Number: 5,896,123
[45] Date of Patent: Apr. 20, 1999

[54] INFORMATION PROCESSING METHOD AND APPARATUS

[75] Inventors: Junichi Nagahara, Tokyo; Toshikazu Minoshima, Kanagawa, both of Japan

[73] Assignee: Sony Corporation, Tokyo, Japan

[21] Appl. No.: 08/661,951

[22] Filed: Jun. 12, 1996

[30] Foreign Application Priority Data

Jun. 16, 1995 [JP] Japan ................................. 7-150768

[51] Int. Cl.$^6$ ................................................ G09G 3/02
[52] U.S. Cl. ........................ 345/145; 345/146; 345/157
[58] Field of Search ............................. 345/157, 156, 345/158, 163, 145, 146, 348, 352, 168

[56] References Cited

U.S. PATENT DOCUMENTS

| | | | |
|---|---|---|---|
| 4,698,625 | 10/1987 | McCaskill et al. | 345/157 |
| 5,091,866 | 2/1992 | Takagi | 345/343 |
| 5,198,802 | 3/1993 | Bertram et al. | 345/146 |
| 5,230,063 | 7/1993 | Hoeber et al. | 345/157 |
| 5,298,890 | 3/1994 | Kanamaru et al. | 345/115 |
| 5,420,976 | 5/1995 | Schell et al. | 345/146 |
| 5,453,758 | 9/1995 | Sato . | |
| 5,565,888 | 10/1996 | Selker | 345/145 |
| 5,598,183 | 1/1997 | Robertson et al. | 345/157 |

*Primary Examiner*—Xiao Wu
*Attorney, Agent, or Firm*—Limbach & Limbach L.L.P.

[57] ABSTRACT

An information processing method and apparatus employing a pointing device, such as a mouse, as an input device. A cursor and one or more objects are displayed on a display device of an information processing apparatus, and the position of the cursor is moved in the picture based on coordinate data entered to the information processing apparatus for displaying the cursor thus moved on the display device. If, when the cursor is positioned on one of the objects, data instructing execution of processing is entered to the apparatus, a pre-set processing defined for each object is executed. If, as a result of cursor movement, the cursor enters a pre-set area defined for the object, the cursor is moved to near the center of the object and displayed on the display device. The cursor may be moved easily by the pointing device and the information processing apparatus is improved in operability.

24 Claims, 8 Drawing Sheets

INFORMATION PROCESSING METHOD AND APPARATUS

BACKGROUND OF THE INVENTION

1. Field of the Invention

This invention relates to an information processing apparatus employing a pointing device, such as a mouse, as an entry device, and an information processing method employing such pointing device, such as a mouse, as an entry device.

2. Description of the Related Art

In recent information processing apparatuses, a pointing device, such as a mouse, is occasionally employed as an entry device.

In such information processing apparatuses, a cursor position in a picture displayed on a display is shifted depending on coordinate data entered from a pointing device and represented by on X and Y coordinates. A command for executing the processing is then entered whilst the cursor is positioned on a particular object, after which pre-set processing defined on the object is executed.

Up to now, mice or trackballs have been widely employed as pointing devices. Such pointing devices include a ball and a detection unit for detecting the direction and the amount of rotation of the ball and coordinate data is outputted based on the direction and the amount of rotation of the ball.

Recently, a pointing device having a main body portion which is moved in a three-dimensional space for entering coordinate data, or a so-called air mouse, has been developed. This air mouse has a detection unit for detecting the acceleration of movement of the main body portion and coordinate data is outputted based on the detected acceleration.

Such air mouse has a merit that, since coordinate data can be entered on simply moving the main body portion in a three-dimensional space, a ball supporting surface, such as a desk surface, as is required in a mouse, is not required, and coordinate data can be entered in a completely contact-free manner with respect to another surface. An example of such a pointing device is disclosed in U.S. Pat. No. 5,453,758. However, acceleration with this air mouse cannot be detected accurately with ease, the air mouse is not excellent at present in input precision. Therefore, it is difficult for the user to shift the cursor correctly to a desired position.

A wireless type pointing device also has come into use. When the wireless type pointing device is in use, coordinate data is transmitted from the pointing device to the main body portion of the information processing apparatus over a radio route and cursor movement on the display device occurs based on the transmitted coordinate data.

Such a wireless type pointing device is effective in particular if the user is at some distance from the screen of the display device since there is no space limitation imposed by a cable interconnecting the information processing apparatus and the pointing device. Therefore, it may be presumed that, as the use of the wireless type pointing device becomes popular, the chance of using a pointing device under a condition in which the user is at some distance from the screen of the display device is increased. However, if the user is at some distance from the screen of the display device, the pointing device becomes difficult to manipulate such that it becomes difficult for the user to shift the cursor correctly to a desired position.

As described above, a variety of pointing devices are used under various situations such that a problem has been presented wherein a cursor cannot be moved precisely to desired places without difficulties.

SUMMARY OF THE INVENTION

It is therefore an object of the present invention to provide an information processing apparatus and an information processing method excellent in operability and in which movement of a cursor by a pointing device to a position desired by the user is facilitated.

According to the present invention, there is provided an information processing apparatus includes data entry means, control means for performing processing based on data entered from the data entry means, and display means for displaying a picture inclusive of the cursor and one or more objects based on processing by the control means. The control means moves the position of the cursor in the picture for display on a display device based on coordinate data entered from the data entry means. If, when the cursor is positioned on an object, data instructing the execution of the processing is entered from the data entry means, the control means executes the pre-set processing defined for the object. When the cursor enters a pre-set area defined for each object, the control means moves the cursor to near the center of the object for display on the display device.

Preferably, the control means of the information processing apparatus modifies the shape of the cursor to a shape defined for a specified object if the cursor is located on such specified object. Also preferably, the control means of the information processing apparatus modifies the shape of the cursor to a shape defined for a specified area in the picture if the cursor is located in such specified area.

With the information processing apparatus of the present invention, if the cursor enters a pre-set area defined for each object, the cursor is moved to near the center of the object and there displayed. Thus the user can easily and correctly comprehend whether or not the cursor has been moved to the object.

According to the present invention, the cursor may be moved easily and correctly to the object and an information processing apparatus may be provided which is improved in operability and in which cursor movement by the pointing device may be facilitated.

DESCRIPTION OF THE PREFERRED EMBODIMENTS

Figure 1:
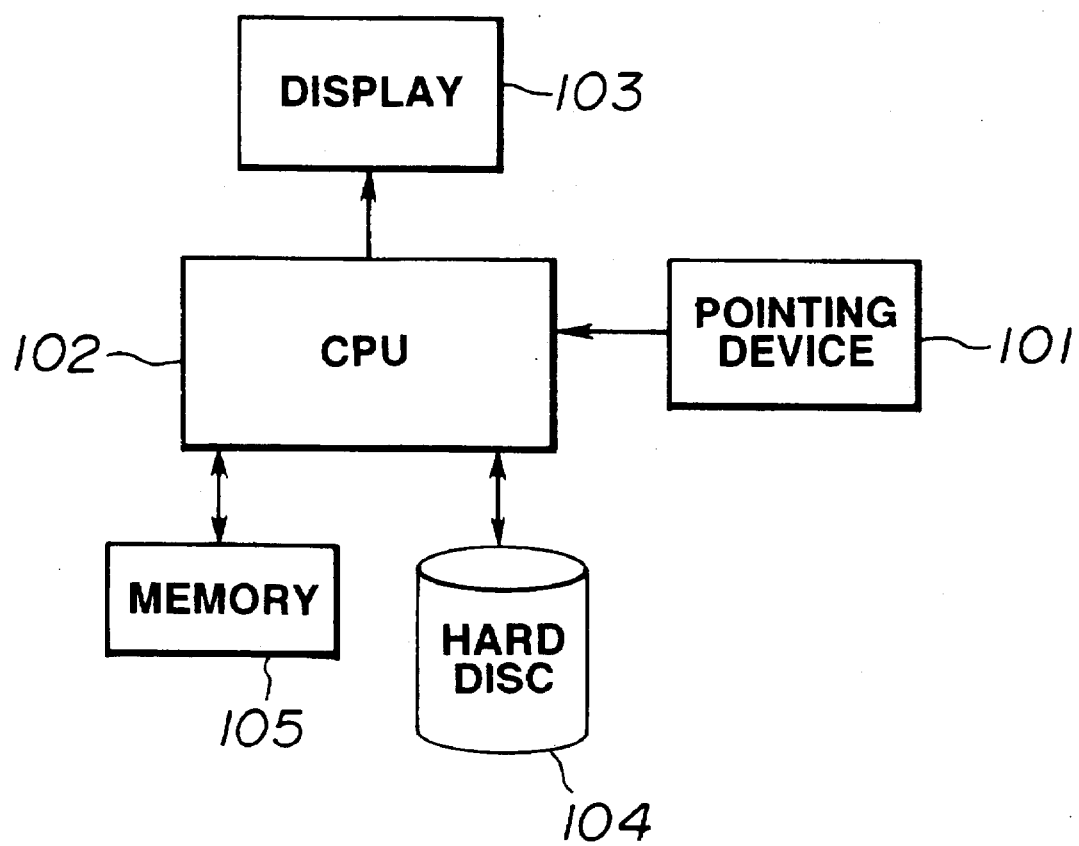
FIG. 1 is a block diagram showing an embodiment of an information processing apparatus according to the present invention.

Referring to the drawings, preferred embodiments of the information processing apparatus according to the present invention will be explained in detail.

Referring first to FIG. 1, the information processing apparatus of a first embodiment includes a pointing device 101, as data entry means for entering coordinate data or the like, such as a mouse, a trackball or a joystick, and a central processing unit (CPU) 102, as control means for processing data entered by the data entry means. The information processing apparatus also includes a display 103, as display means for displaying a picture including a cursor, an object and other regions based on processing by the control means, a hard disc device 104, as external storage means for storing data of various types or software and a memory 105 as internal storage means for storing results of execution of processing by the control means.

The data entry means may be provided with an entry device, such as a keyboard, in addition to the pointing device 101. The control unit may also be provided with other processors, such as those processing specified pictures or speech, in addition to the CPU 101, as will be explained subsequently. The external storage unit may be a magnetic tape device, magneto-optical disc device or an optical disc device, alone or in combination, in addition to the hard disc device 104.

In the picture displayed on the display 103 of the information processing apparatus, the cursor is used for entering data with the pointing device 101. This cursor is displayed as being moved on the display 103 based on coordinate data entered by the pointing device 101. If, when the cursor is at a specified position on the screen displayed on the display 103, that is when the cursor is on a specified object on the screen displayed on the display 103 or in a specified area of a picture displayed on the display 103, a button provided on the pointing device 101 is pressed for entering data instructing execution of processing defined in the object or the area from the pointing device 101 to the CPU 102, the CPU 102 executes the processing defined in the object or area. In the following description, such data entry instructing the execution of processing from the pointing device 101 to the CPU 102 when the cursor is at a specified object or in a specified area is termed "clicking" the object or area.

On the other hand, the object is a graphic representation enabling the user to enter a command easily as he or she views the display 103 for visual judgment. If the object is clicked, the pre-set processing defined for the object is executed. In the object, a pre-set area termed an object area is defined from object to object, such that, if data commanding execution of processing is entered by the pointing device 101 to the CPU 102 when the cursor is at the object area, the object is clicked. Although the object area is usually coincident with the size of the object actually displayed, it is not necessary for the actually displayed object to be coincident with the object area. Such object, generally termed an icon, is displayed as a picture of a figure relevant to the processing defined for the object in order to permit the user to visually comprehend the processing defined for the object with ease.

Figure 2:
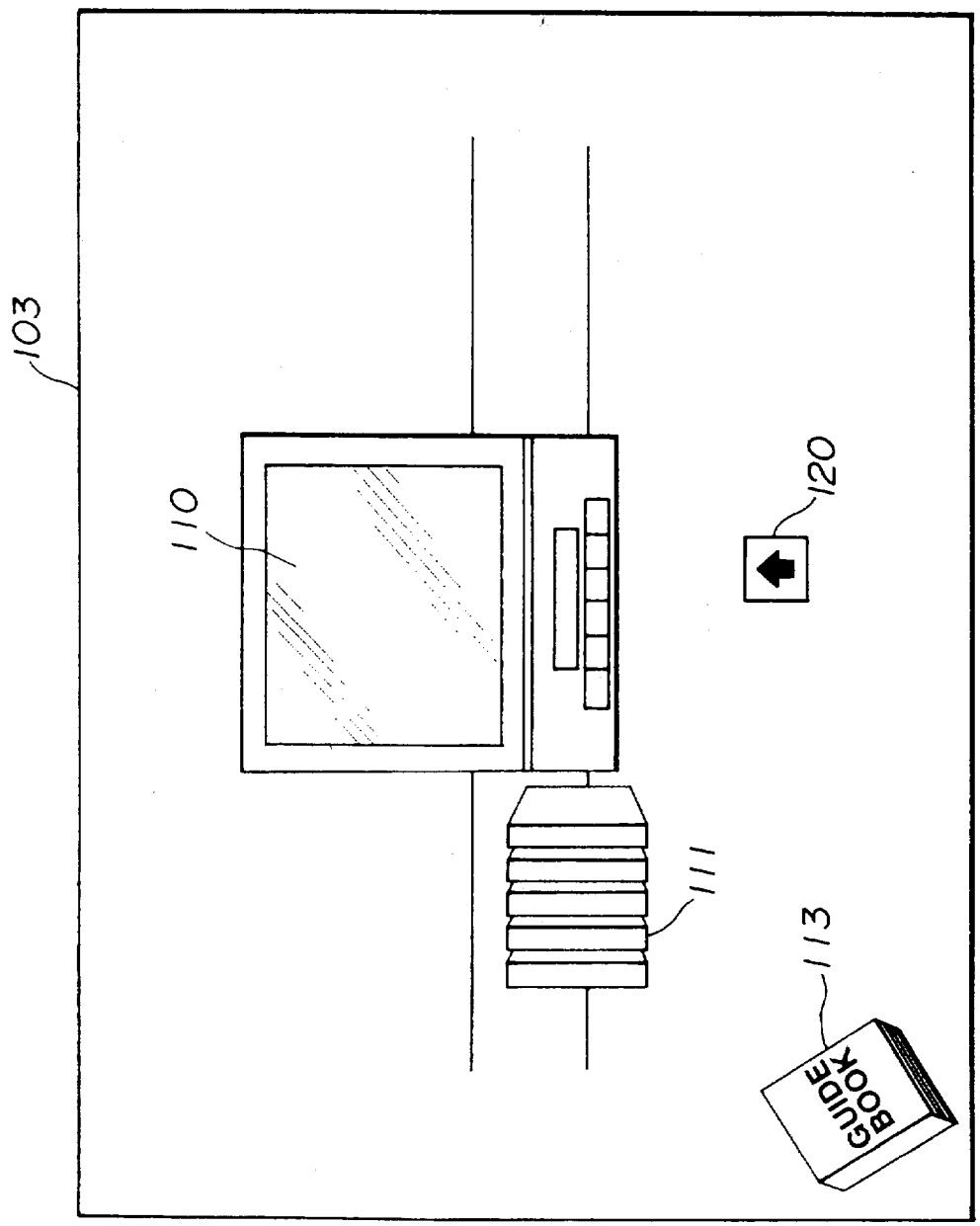
FIG. 2 illustrates an example of a picture displayed on a display unit of the information processing apparatus according to the present invention.

FIG. 2 shows an example of a picture displayed on the display 103 based on processing by the CPU 102. In FIG. 2, a cursor 120, not positioned in any object area, an object 110 looking like a television receiver, an object 111 looking like a video tape and an object 113 looking like a guide book, are displayed. For the object 110 looking like a television receiver, the processing is defined so that, on clicking, a television picture is displayed on the display 103. For the object 111 looking like a video tape, the processing is defined so that, on clicking, a video image is displayed on the display 103. For the object 113 looking like a guide book, the processing is defined so that, on clicking, the method of using the information processing apparatus is displayed on the display 103.

Figure 3:
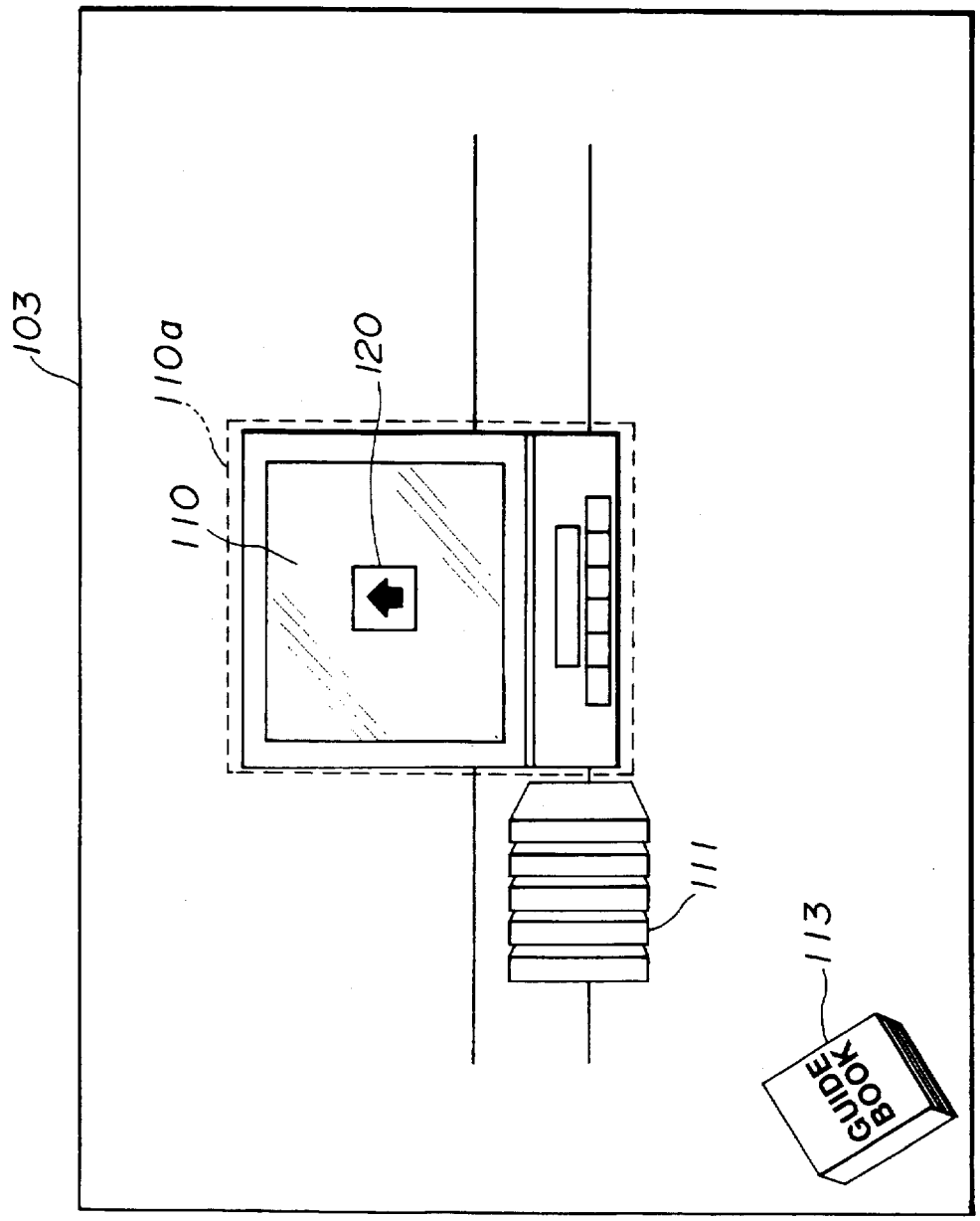
FIG. 3 illustrates another example of a picture displayed on a display unit of the information processing apparatus according to the present invention.

When the cursor 120 is intruded from outside to inside of the object area, the CPU 102 causes the cursor 120 to be moved to near the center of the object so as to be there displayed. Specifically, if the cursor 120 is moved from outside the object area into the inside of the object area of the object 110 looking like a television receiver, as shown for example in FIG. 2, the CPU 102 causes the cursor 120 to be moved to near the center of the object so as to be there displayed, as shown for example in FIG. 3.

If an object area is coincident in size with the object 110 looking like a television receiver, the cursor 120, moved to near the television receiver icon, appears to the user as having been drawn to the center of the television receiver icon, as a result of the above processing by the CPU 102.

If an object area 110a of the object 110 looking like a television receiver is larger in size than the object 110 represented on the display 103, the cursor 120, moved to near the television receiver icon, appears to the user as having been drawn to the center of the television receiver icon.

By moving the cursor 120, thus moved into the object area, by the CPU 102 further, the cursor 120 may be moved to near the center of the object even though the coordinate data have not been entered correctly. Therefore, even in cases wherein an air mouse is used as the pointing device 101 or the user is at some distance from the display 103, such that the cursor 120 cannot be moved correctly to the desired position, the user may easily move the cursor 120 to near the center of the object.

Preferably, the degree of movement of the cursor 120 is adaptively changed depending on the type of the pointing device 101 employed or on the conditions of use, such as the distance between the display 103 and the pointing device 101. That is, if a pointing device 101 that cannot be moved correctly to the desired position, such as an air mouse, is used, the object area is preferably set so as to be larger in area in order to permit the cursor to be drawn to near the center of the object more easily. This enables the object to be easily specified even with the use of a pointing device with which it is rather difficult to move the cursor 120 correctly to the desired position. Conversely, if a pointing device with which the cursor 120 can be easily moved correctly to a desired position, such as a usual mouse adapted to enter coordinate data by ball rotation, is used, it is preferred to set the object area so as to be narrow in area so that the cursor is not liable to be drawn to near the center of the object. The reason is that, if the cursor can be easily moved correctly and the cursor is drawn frequently to near the center of the object, the user feels that the apparatus is difficult to use.

Figure 4:
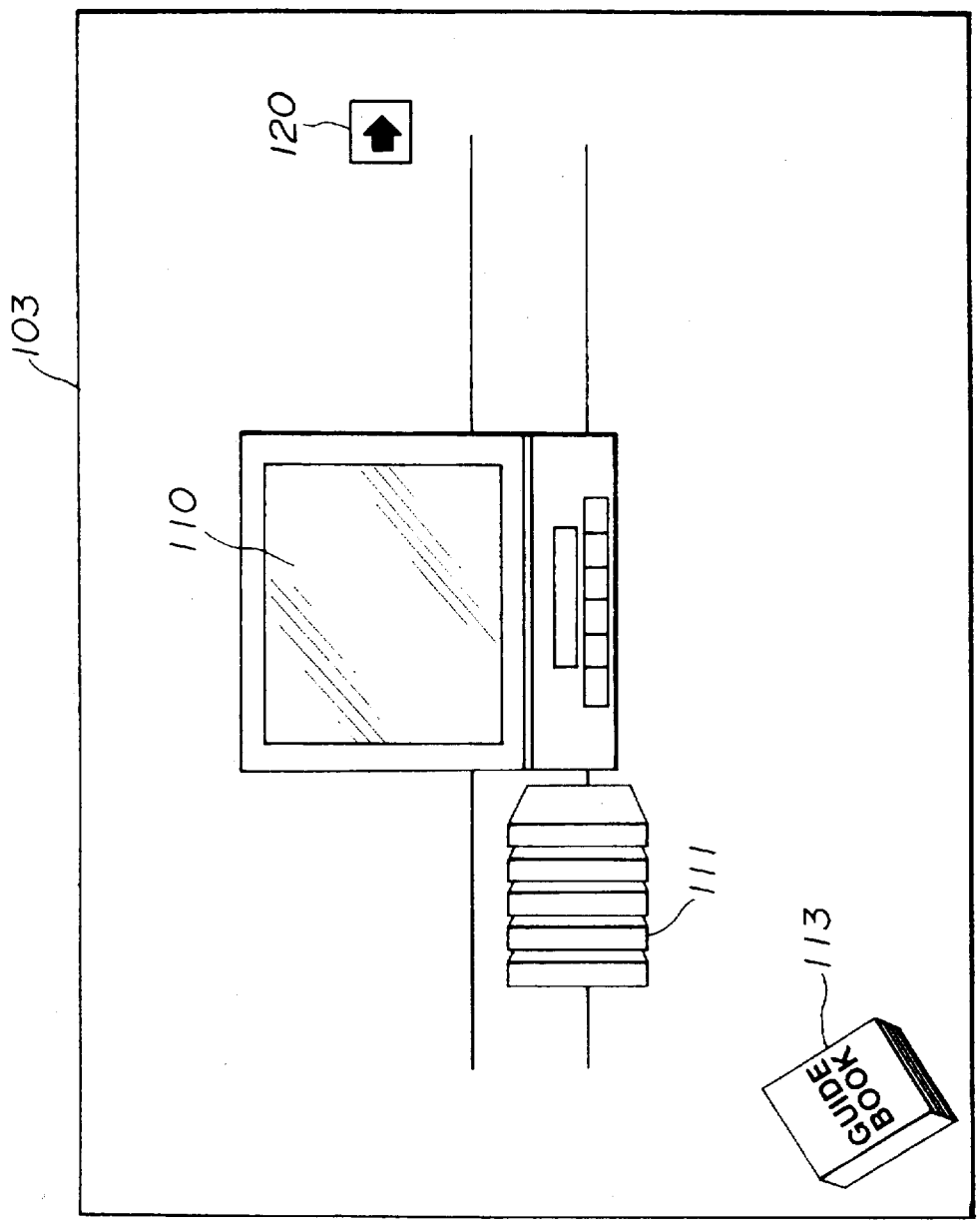
FIG. 4 illustrates another example of a picture displayed on a display unit of the information processing apparatus according to the present invention.

In addition, the CPU 102 varies the shape of the cursor 120 displayed on the display 103 depending on the position of the cursor 120 on the screen of the display 103. Specifically, an area is set near the right hand side of the screen so that, if such area is clicked, the display on the screen is scrolled towards right. Similarly, an area is set near the left hand side of the screen so that, if such area is clicked, the display on the screen is scrolled towards left. If the cursor 120 is moved to the right-hand side portion of the screen, the shape of the cursor 120 is changed to a right arrow, whereas, if the cursor is moved to the left-hand side portion of the screen, the shape of the cursor 120 is changed to a left arrow, as shown in FIG. 4. By changing the shape of the cursor 120 depending on its position on the screen, the user may visually recognize the processing defined in each area.

Figure 5:
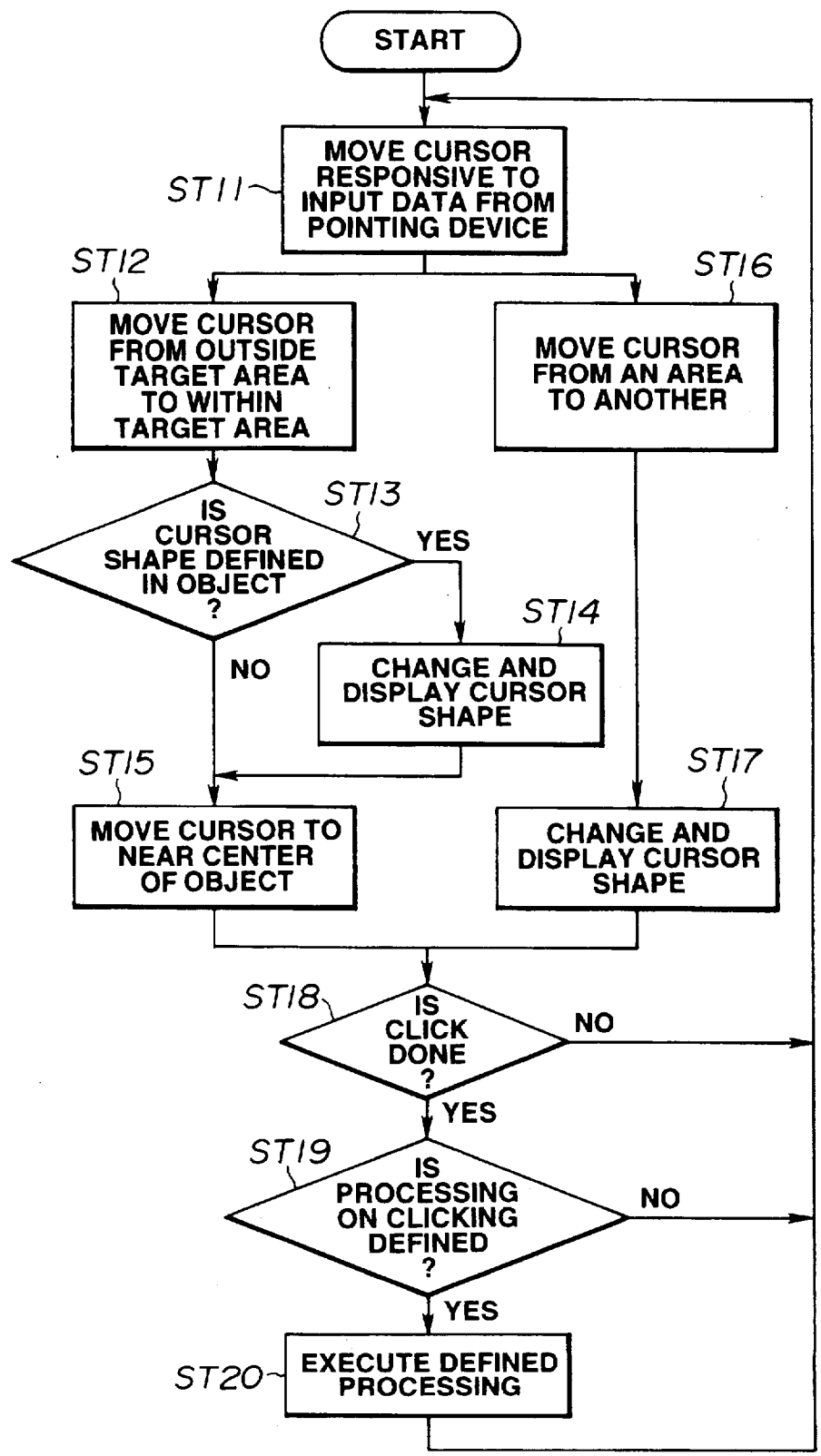
FIG. 5 is a flowchart for illustrating cursor display.

The above-described cursor display in the information processing apparatus is explained in further detail by referring to the flowchart shown in FIG. 5.

On starting the information processing apparatus, the CPU 102 causes the cursor 120 to be displayed on the display 103. Then, at step ST11, the CPU 102 then moves the cursor 120 on the display 103 responsive to entry of the coordinate data from the pointing device 101.

If the cursor 120 is intruded from outside into inside of the object area, the processing transfers to step ST12 and, if the cursor is moved from an area into another area, the processing transfers to step ST16.

If the cursor 120 is intruded from outside to inside of the object area, the processing transfers from step ST12 to ST13. At step ST13, the CPU 102 judges whether or not the cursor shape has been defined in the object. If the cursor shape is defined, the processing transfers to step ST14 and, if otherwise, to step ST15. At step ST14, the CPU 102 changes the shape of the cursor 120 to a shape defined in the object for display on the display 103. This makes it possible to change the shape of the cursor 120 from one object to another. By changing the shape of the cursor 120 in order to permit the processing in the object to be visually recognized by the user, a man-machine interface may be realized which is more comprehensible to the user and more excellent in operability. After changing the shape of the cursor 120, the processing transfers to step ST15.

The CPU 102 moves the cursor 120 at step ST15 to near the center of the object. This causes the cursor 120 to be drawn towards the center of the object once the cursor 120 enters the object area. Thus the cursor 120 may be correctly moved to near the center of the object easily and reliably without the user entering the coordinate data correctly using the pointing device 101. After the cursor 120 has been moved to near the center of the object, the processing transfers to step ST18.

If the cursor 120 is moved from an area to another area, the processing transfers from step ST16 to step ST17. At this step ST17, the CPU 102 changes the cursor shape to the shape defined in the area for display on the display 103. By changing the shape of the cursor 120 in order to permit the processing contents defined in the area to be visually recognized easily, a man-machine interface may be realized which is more comprehensible to the user and more excellent in operability. Of course, if the cursor shape is not defined in the area or the cursor shape defined in the previous area is the same as the cursor shape defined in the current area, the cursor shape is of the same shape as that in the previous area. After step ST17, the processing transfers to step ST18.

At step ST18, the CPU 102 judges whether or not the object or the area has been clicked. If the object or area has been clicked, processing transfers to step ST19. If the object or area has not been clicked, and the pointing device 101 is moved further, processing reverts to step ST11 to repeat the same operating sequence. At step ST19, it is judged whether or not a pre-set processing has been defined in the clicked object or area. If it is judged at step ST19 that pre-set processing has been defined, processing transfers to step ST20 where the defined processing is executed by the CPU 102. The processing then reverts to step ST11 to repeat the same operating sequence. If it is judged at step ST19 that the pre-set processing has not been defined, the processing reverts to step ST11 to repeat the same operating sequence.

By the above processing, the cursor shape is changed depending on the object or the area, while the cursor 120 is moved to near the center of the object when the cursor 120 has entered the object area.

The above-described variable display of the cursor shape depending on the object or area is particularly effective for displaying a three-dimensional picture on the display 103 by three-dimensional data. Specifically, if a virtual reality space, similar to the real world, is displayed on the display and the user performs a variety of processing operations in this virtual reality space, and the cursor 120 is changed in shape, it becomes possible to guide the user in moving in the virtual reality space with the aid of the cursor shape.

Meanwhile, if a picture displayed on the display 103 is comprised of three-dimensional data, object overlap need to be taken into account. That is, if the cursor 120 is situated on overlapped objects, it is necessary to decide which of the objects is specified by the cursor 120.

Figure 6:
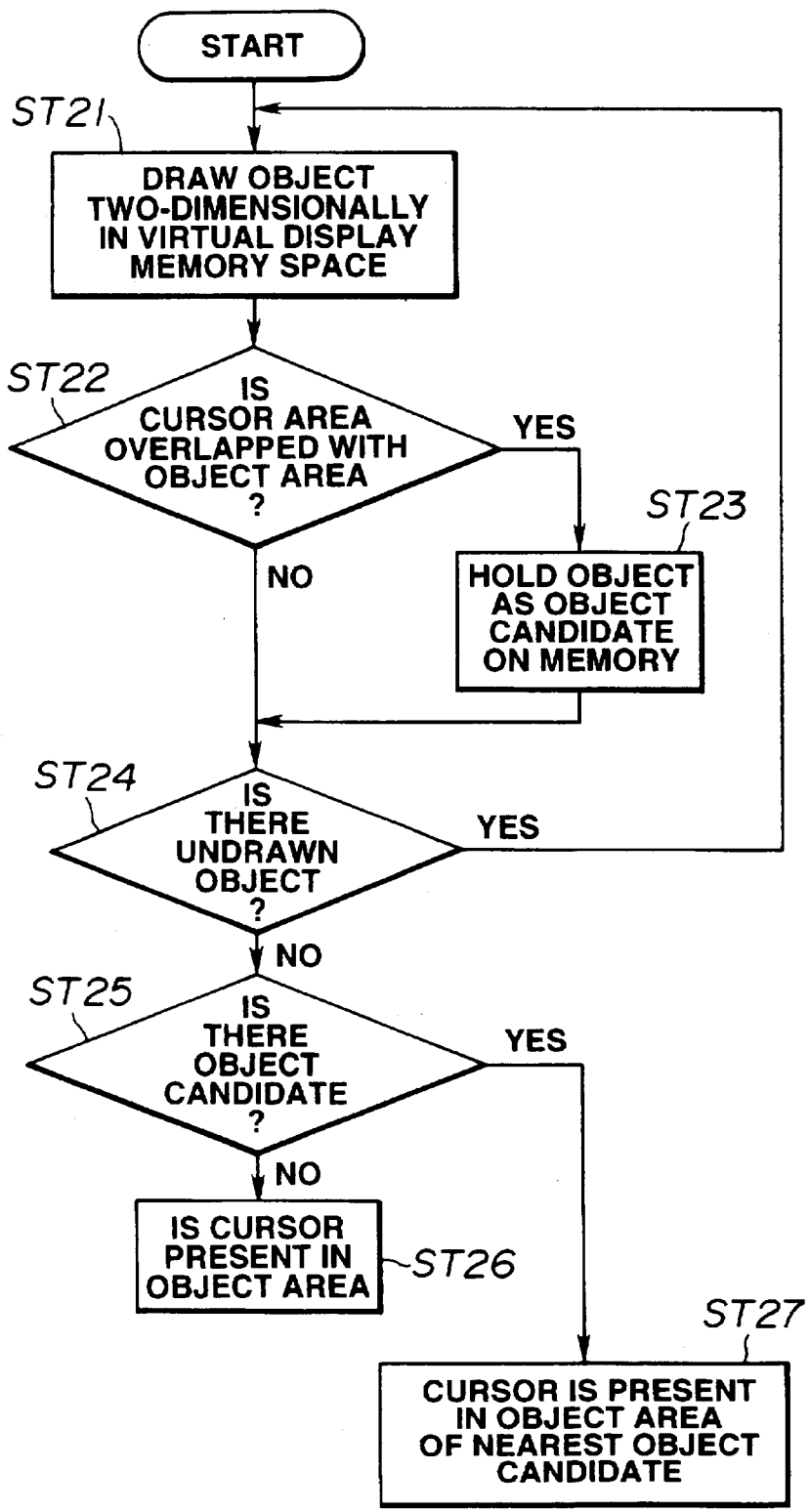
FIG. 6 is a flowchart for illustrating judgment on the relation between a target on a three-dimensional picture and a cursor.

The operation for the case in which a picture is comprised of three-dimensional data is explained by referring to the flowchart of FIG. 6.

If the picture is comprised of three-dimensional data, a virtual display memory space, having the same area as the picture area displayed on the display 103, is set in the memory 105.

Then, at step ST21, the CPU 102 converts one of the objects into a two-dimensional picture and delineates the converted picture in this virtual display memory space. Then, at step ST22, the CPU 102 judges whether or not the cursor area indicated by the cursor 120 overlaps with the two-dimensional picture of the object delineated in the previous step. If the result of judgment is YES, the processing transfers to step ST23 and, if otherwise, to step ST24.

At step ST23, the CPU 102 stores the object in the memory 105, as an object candidate overlapped with the cursor 120, before proceeding to step ST24.

At step ST24, the CPU 102 judges whether or not there is any object not delineated in the virtual display memory space. If the result of judgment is YES, the processing reverts to step ST21 in order to delineate the object, not delineated as yet, in the virtual display memory space. If the result of judgmental step ST24 is NO, the processing transfers to step ST25.

The CPU 102 then refers at step ST25 to the memory 105 in order to judge whether or not there is any object candidate. If there is no object candidate, the CPU 102 judges that the cursor 120 is not present in any object area. If there is any object area, the CPU 102 judges that the cursor is present in the object area of the object candidate among the object candidates which is nearest at hand.

By the above processing, the CPU 102 may decide which of the objects is indicated by the cursor 120, even if the picture represented on the display 103 is three-dimensional data and plural objects are overlapped with one another.

Figure 7:
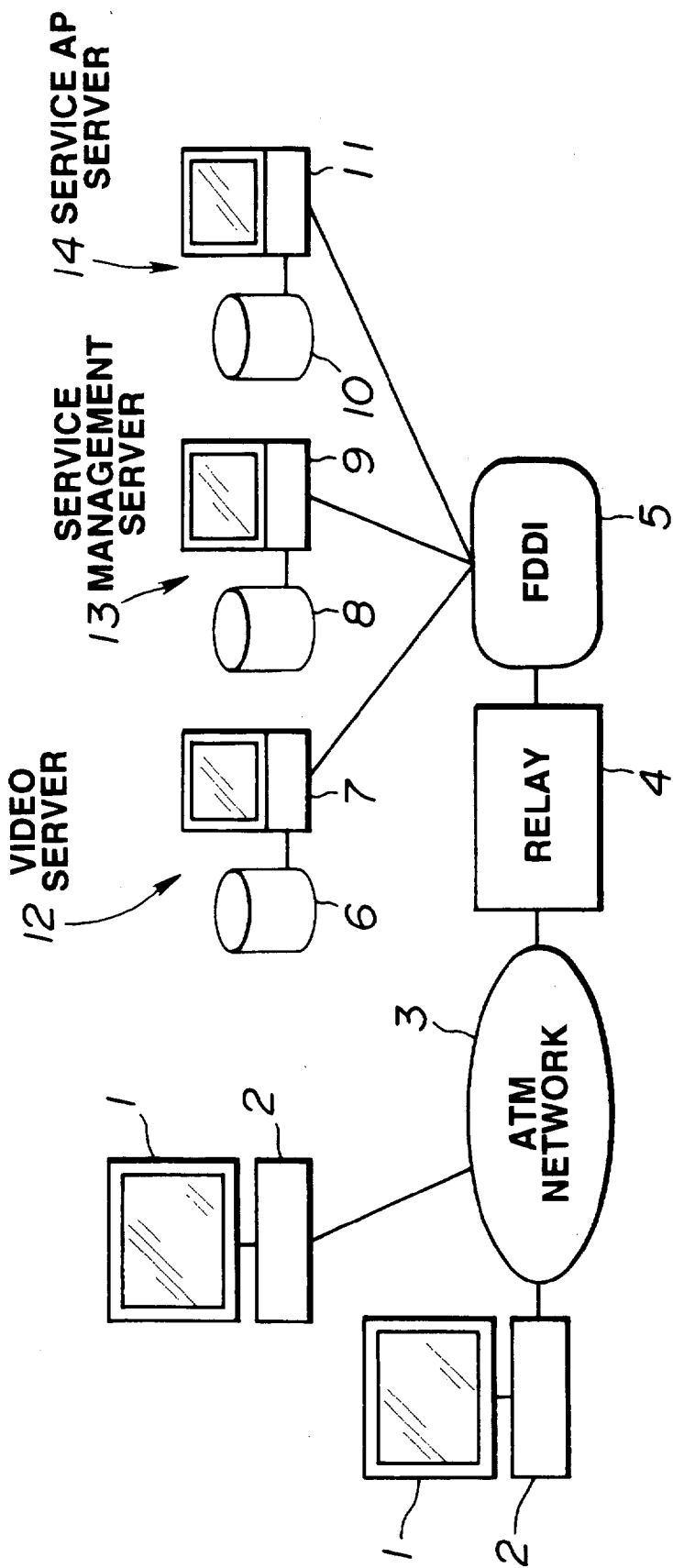
FIG. 7 is a block diagram showing an embodiment of an on-line system including the information processing apparatus according to the present invention.
Figure 8:
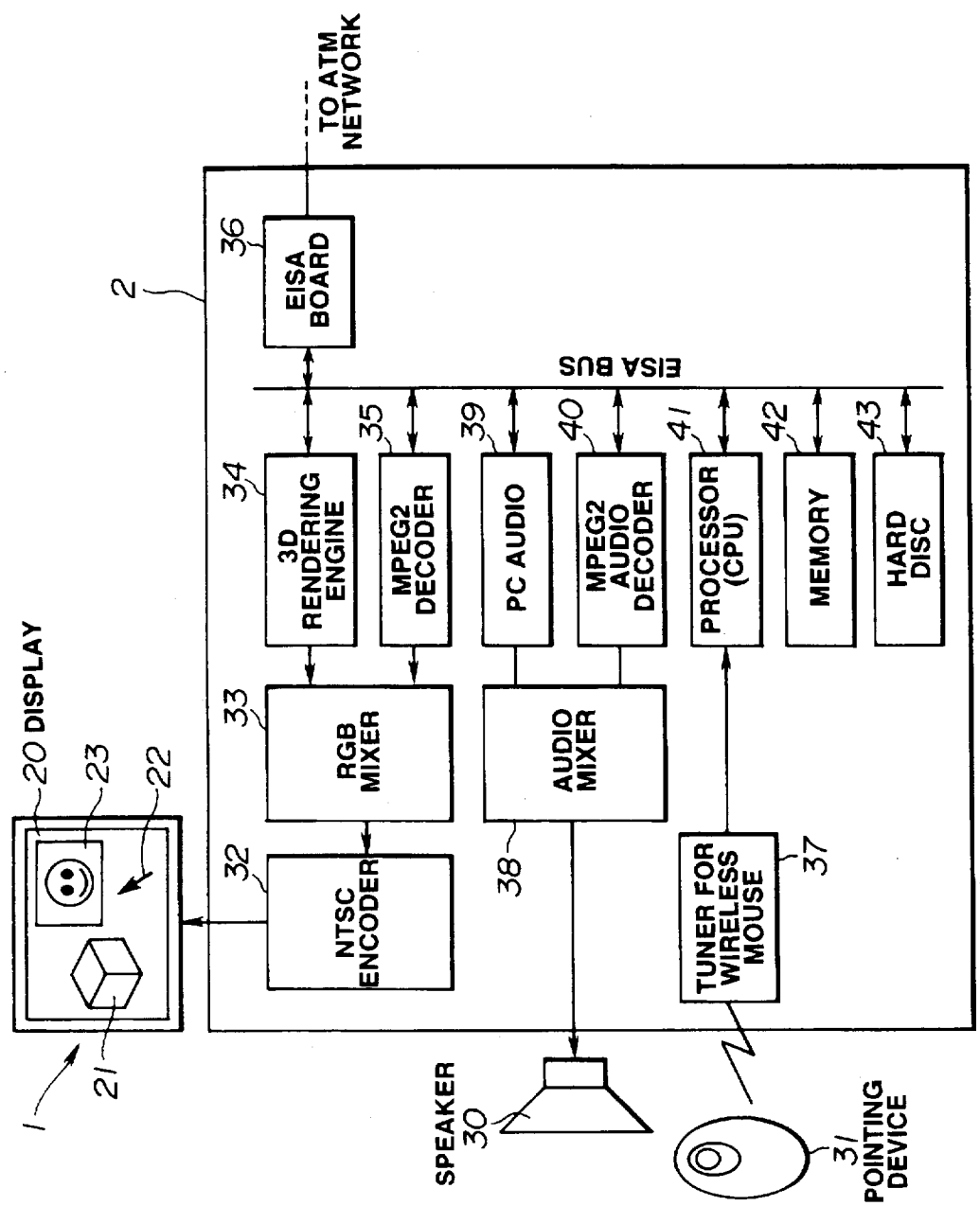
FIG. 8 is a block diagram showing an embodiment of an information processing apparatus applied to the on-line system.

Referring to FIGS. 7 and 8, an illustrative system in which the above-described information processing apparatus is employed as an on-line terminal apparatus is explained. The system of the present embodiment is an on-line service system in which an on-line server as a server computer is connected with an on-line terminal device as a client computer over a communication network and a variety of services are purveyed from the on-line server to the on-line terminal device. The on-line services may be, e.g., home shopping, video-on-demand, communication karaoke or game-soft distribution.

In the system of the present embodiment, an on-line terminal device 2, which is an information processing apparatus according to the present invention, as a client computer, is connected via a large-scale ATM (asynchronous transmission mode) network 3, a relay 4, and a fiber distribution data interface (FDDI) 5, to a service management server 13, a video server 12 and a service AP server 14, which are service purveying side on-line servers, as shown in FIG. 7. The asynchronous transmission mode (ATM) divides the transmission data into plural fixed-length data, that is 48-byte-based data, irrespective of data types, and appends a 5-byte header, inclusive of the information on the address of the destination of data transmission, to the fixed-length data, in order to transmit data in terms of data units called "cells" each made up of 53 bytes. These cells, fed into the ATM network 3, are switched by the ATM switcher based on the header information. On arrival at the receiving terminal, the cells are restored to the original data based on the header information. The ATM network can transmit speech, moving pictures and computer data in admixture. The FDDI is a medium accessing system of a 100 Mbit/second token passing system employing optical fibers.

The video server 12 is comprised of a data storage device 6, made up of the server computer 7 and a data storage device 6, such as a hard disc or an optical disc. In the data storage device 6 is stored digital video data processed into a format, such as MPEG format as later explained. The digital video data is read out from the data storage device 6 of the video server 12 for transfer in response to a request from the on-line terminal device 2.

The service AP server 14 is similarly comprised of a server computer 11 and a data storage unit 10. In the data storage unit 10, data or scripts which form the basis of a three-dimensional picture as application (AP) program data is stored. From the data storage device 10 of the service AP server 14, the application program data is read out for transfer in response to the request from the on-line terminal device 2.

The service management server 13 is similarly comprised of a server computer 9 and a data storage device 8. The service management server 13 accepts requests from the on-line terminal device 2 and controls or manages the video server 7 or the service AP server 11 in response to these requests.

It is possible to provide plural video servers 12 and plural service AP servers 14, or to assemble the servers 12 to 14 in a single server.

The requests transferred through the ATM network 3 are transmitted to the server via a device for doing protocol conversion, termed a relay 4, automatic data distribution and data transfer speed conversion, and via the FDDI interface 5.

The data sent from the server in response to the requests from the on-line terminal device 2 is processed for display by the on-line terminal device 2 so as to be displayed on the display on the monitor. This completes a graphical user interface (GUI), that is a user interface employing the graphic display. Thus the user may operate or receive services as he or she views the graphic display on the display of the monitor device 1.

The in-line terminal device 2 shown in FIG. 7 is arranged as shown for example in FIG. 8. That is, the on-line terminal device 2 includes an EISA (Extended Industry Standard Architecture) board 36, as connection means for connection to an on-line server, a pointing device 31, as data entry means for entering coordinate data or instructions from the user, and a processing unit 41, as control means, for doing processing based on the information supplied from the on-line server via the connection means and instructions entered from the data entry means. The on-line terminal device 2 also includes a three-dimensional rendering engine 34, an MPEG decoder 35, a PC audio decoder 39, an MPEG2 audio decoder 40, an RGB mixer 33, an audio mixer 38, a tuner for a wireless mouse 37 and an NTSC encoder 22. The on-line terminal device 2 further includes a display 20, as display means for representing a picture based on processing by the control means, a memory 42, as storage means for transiently holding data, and a hard disc 43, as external storage means for storing and holding data or software. The virtual reality space is displayed on the display 20 based on the information supplied from the on-line server via the EISA board 36.

Referring to FIG. 8, the EISA board 36 is a board for communication interconnecting the on-line terminal device 2 and the ATM network 3. The signals supplied from the on-line server to the EISA board 36 via the ATM network 3 are transiently stored in the hard disc 43 controlled as to data reading and data recording by the processing unit 41. The signals are then read out depending on data sorts and supplied to the three-dimensional rendering engine 34, MPEG decoder 35, PC audio decoder 39 and to the MPEG2 decoder 40.

The 3D rendering engine 34 is a coordinate converter for converting three-dimensional coordinate data of a three-dimensional object into data for display on the display 20 of the monitoring device 1, that is into video data in the three-dimensional virtual reality space. That is, the 3D rendering engine 34 is designed to construct the graphical user interface (GUI) conforming to the application.

The MPEG2 decoder 35 is a decoder for expanding data compressed by the MPEG2 standard. Meanwhile, MPEG (Moving Picture Experts Group) 2 is an international standard for the technique of compression and expansion of moving pictures.

Since data from the 3D rendering engine 34 and data from the MPEG2 decoder 35 are both data of three prime colors of red (R), green (G) and blue (B), the RGB mixer 33 generates data which is a mixture of these three colors R, G and B.

The NTSC encoder 32 converts data from the RGB mixer 33 into signals of the television standards of NTSC (National Television System Committee) system. The video signals from the NTSC encoder 32 are displayed on the display 20 of the monitoring device 1. On the display 20 in the present embodiment, shown in FIG. 2, there are displayed the pointer (cursor) 22 by the pointing device 31, a picture 23 obtained on decoding MPEG2 and a picture for GUI by the 3D rendering engine 34, such as the three-dimensional or two-dimensional picture 21. The picture by the MPEG2 and the picture for GUI may be synthesized for display.

The PC audio decoder 39 generates, for example, the effect sound, using an ADPCM (adaptive differential pulse code modulation) sound source. The MPEG2 audio decoder 40 expands audio data compressed by MPEG2. The data from the PC audio decoder 39 and the data from the MPEG2 audio decoder 40 are mixed by the audio mixer 38 into audio signals which are sent to a speaker 30. The output speech from the speaker 30 is preferably the stereo speech or multi-channel speech. Use may be made of a recently developed system in which a sound image may be three-dimensionally fixed by controlling the phase difference of the stereo sound.

The operation on the display 20 employing GUI is executed using the pointing device 31, for example, a wireless air mouse. The coordinate data transmitted by a radio route by electrical waves from the wireless air mouse is received by a wireless tuner 37. The received coordinate data are sent to the processing unit 41. The pointing device 31 may also be a usual mouse, trackball, joystick or a touch panel associated in the coordinate positions thereof with the display 20, in place of the wireless air mouse. Of course, keyboards or the like may also be provided as data entry means in addition to the pointing device 31.

The processing unit 41 has a central processing unit (CPU), and controls various component elements over a bus based on program data stored in the program ROM of the memory 42 having the function of both the program ROM and the work RAM. The processing unit also controls the GUI based on coordinate data from the pointing device 31 and occasionally executes the communication with the server computer. Although the 3D rendering engine 34 and the MPEG2 decoder 35 are provided as independent chips in the embodiment of FIG. 2, signal processing by these components may also be performed by software by the above processing unit 41.

The illustrative operation of on-line service purveying to the user in case of using the system of FIGS. 1 and 2 is now explained.

The user first instructs connection on the network of the on-line terminal device 2 to the server computer, herein the computer 9 of the service management server 13, using the pointing device 31.

When the connection on the network is completed on the network and the request is supplied from the on-line terminal device 2, the computer 9 of the service management server 13 on the server side is responsive to the request to control the video server 12 and the service AP server 14 to transfer data and software to the on-line terminal device 2. The data and software, thus transferred, are those required for processing, and may be enumerated by scripts stating the behavior of the virtual reality space, three-dimensional coordinate data and speech data in the virtual reality space and scripts stating alternatives instructed from the on-line terminal device 2 to the user.

The on-line terminal device 2 presents virtual reality space, derived from data and software received from the server side, using the screen of the display 20 of the monitor device 1 and occasionally the speaker 30.

The user strolls in the inside of the virtual reality space presented on the on-line terminal device 2, as he or she views the virtual reality space and instructs the direction of movement and so forth. The user also operates on a component or installation in the virtual reality space by actuating an operating button or the like provided on the pointing device 31.

The on-line terminal device 2 is responsive to the user actuation by the viewing point position, viewing line direction, speech and the operation or behavior of the components in the virtual reality space in accordance with the scripts, and presents the virtual reality space to the user, with the aid of the display 20 and the speaker 30 of the monitoring device 1, as though the user were present in the virtual reality space. The on-line terminal device 2 is also responsive to the statement of the scripts to present a variety of information items or give an advice to the user or place an order for the user.

What is claimed is:

1. An information processing apparatus wherein a cursor moves on a display including one or more objects each having a preset area around it, comprising:

data entry means for a user to enter data;

control means for causing a cursor position to be moved based on coordinate data entered by the data entry means, automatically moving the cursor to near the center of an object when the cursor moves into the pre-set area defined around said object and for executing pre-set processing defined for said object when said cursor is located in said object and data instructing the execution of the pre-set processing is entered from said data entry means; and display means for displaying a picture inclusive of the cursor and the object based on processing by said control means.

2. The information processing apparatus as claimed in claim 1 wherein, if the cursor is located on a specified object, said control means modifies the shape of the cursor to a specified shape defined for the object for displaying the cursor thus modified in shape on said display means.

3. The information processing apparatus as claimed in claim 1 wherein, if the cursor is located on a specified area in a picture, said control means modifies the shape of the cursor to a specified shape defined for the area for displaying the cursor thus modified in shape on said display means.

4. The information processing apparatus as claimed in claim 1 comprising connection means for connection to an on-line server so that the information processing apparatus may be used as an on-line terminal performing processing based on the information supplied via said connection means from the on-line server.

5. The information processing apparatus as claimed in claim 1, further comprising a second data entry means for a user to enter data, said control means moving said cursor to near the center of an object on intrusion of said cursor by movement into a second pre-set area defined in said object and executing pre-set processing defined for said object when said cursor is located in said object and data instructing the execution of the pre-set processing is entered from said second data entry means.

6. The information processing apparatus of claim 1, said control means further for always moving the cursor to near the center of an object when the cursor moves into the pre-set area defined around said object.

7. An information processing method, comprising:

displaying a picture including a cursor and one or more objects each having a preset area around it on a display of an information processing apparatus;

moving the position of said cursor in said picture based on coordinate data entered to said information processing apparatus for displaying the cursor thus moved on the display device;

automatically moving said cursor to near the center of an object when the cursor moves into the pre-set area defined around said object as a result of cursor movement; and executing the pre-set processing defined for the object when said cursor is positioned on said object and when data instructing the execution of the processing is entered to said information processing apparatus.

8. The information processing method as claimed in claim 7 wherein, if the cursor is located on a specified object, the shape of the cursor is modified to a specified shape defined for the object for displaying the cursor thus modified in shape on said display device.

9. The information processing method as claimed in claim 7 wherein, if the cursor is located on a specified area in a picture, the shape of the cursor is modified to a specified shape defined for the area for displaying the cursor thus modified in shape on said display device.

10. The information processing method as claimed in claim 7, further comprising the step of connecting the information processing apparatus via a connection means to an on-line server so that the information processing apparatus may be used as an on-line terminal performing processing based on information supplied via said connection means from the on-line server.

11. The information processing method as claimed in claim 7, wherein said moving step moves the cursor a different distance for each different type of a plurality of types of data entry means utilized, when the cursor is moved to near the center of the object on intrusion of said cursor into a pre-set area defined for each object as a result of cursor movement.

12. The method of claim 7, wherein the step of automatically moving the cursor to near the center of an object is always performed when the cursor moves into the pre-set area defined around the object.

13. An information processing apparatus wherein a cursor moves on a display including one or more objects each having a preset area around it, comprising:

a plurality of data entry means for a user to enter data;

a plurality of pre-set areas defined around each object, each pre-set area corresponding to a different data entry means;

control means for causing a cursor position to be moved based upon coordinate data entered by said plurality of data entry means, moving said cursor to near the center of an object when the cursor moves into the pre-set area defined around said object corresponding to the data entry means being utilized to enter data, and for executing pre-set processing defined for said object when said cursor is located in said object and data instructing the execution of the pre-set processing is entered from the data entry means; and display means for displaying a picture inclusive of the cursor and the object based upon processing by said control means.

14. The apparatus of claim 13, said control means further for always moving the cursor to near the center of an object when the cursor moves into the pre-set area defined around said object corresponding to the data entry means being utilized to enter data.

15. An information processing method, comprising:

displaying a picture including a cursor and one or more objects on a display of an information processing apparatus, each object having a plurality of preset areas around it, each preset area corresponding to a different one of a plurality of data entry means;

moving the position of said cursor in said picture based on coordinate data entered by said plurality of data entry means to said information processing apparatus for displaying the cursor thus moved on the display device;

automatically moving said cursor to near the center of an object when the cursor moves into the pre-set area corresponding to the data entry means being utilized to enter data defined around said object as a result of cursor movement; and executing the pre-set processing defined for the object when said cursor is positioned on said object and when data instructing the execution of the processing is entered to said information processing apparatus.

16. The method of claim 15, wherein said step of moving said cursor to near the center of an object when the cursor moves into the pre-set area defined around said object corresponding to the data entry means being utilized to enter data is always performed when said cursor moves into said pre-set area.

17. A recording medium readable by an information processing apparatus, tangibly embodying a program of instructions executable by the information processing apparatus to perform method steps for displaying and moving a cursor on a display device, said method steps comprising:

displaying a picture including a cursor and one or more objects each having a preset area around it on the display device;

moving the position of said cursor in said picture based on coordinate data entered to said information processing apparatus for displaying the cursor thus moved on the display device;

automatically moving said cursor to near the center of an object when the cursor moves into the pre-set area defined around said object as a result of cursor movement; and executing pre-set processing defined for the object when said cursor is positioned on said object and when data instructing the execution of the processing is entered to said information processing apparatus.

18. The recording medium of claim 17, wherein said program of instructions includes instructions for modifying the shape of the cursor to a specified shape defined for a specified object for displaying the cursor thus modified in shape on said display device when the cursor is located on the specified object.

19. The recording medium of claim 17, wherein said program of instructions includes instructions for modifying the shape of the cursor to a specified shape defined for a specified area in a picture for displaying the cursor thus modified in shape on said display device when the cursor is located on the area.

20. The recording medium of claim 17, wherein said program of instructions includes instructions for connecting a connection means to an on-line server so that the information processing apparatus may be used as an on-line terminal performing processing based on the information supplied via said connection means from the on-line server, wherein said moving step moves the cursor a different distance for each different type of a plurality of types of data entry means utilized, when the cursor is moved to near the center of the object on intrusion of said cursor into a pre-set area defined for each object as a result of cursor movement.

21. The recording medium of claim 17, wherein the program of instructions includes instructions for always moving the cursor to near the center of an object when the cursor moves into the pre-set area defined around the object.

22. The recording medium of claim 17, wherein the program of instructions includes instructions for always moving the cursor to near the center of an object when the cursor moves into the pre-set area defined around said object.

23. The recording medium of claim 22, wherein the program of instructions includes instructions for always moving the cursor to near the center of an object when the cursor moves into the pre-set area defined around said object corresponding to the data entry means being utilized to enter data.

24. A recording medium readable by an information processing apparatus, tangibly embodying a program of instructions executable by the information processing apparatus to perform method steps for displaying and moving a cursor on a display device, said method steps comprising:

displaying a picture including a cursor and one or more objects each having a plurality of preset areas around it on a display of an information processing apparatus, each pre-set area corresponding to a different data entry means;

moving the position of said cursor in said picture based on coordinate data entered by said plurality of data entry means to said information processing apparatus for displaying the cursor thus moved on the display device;

automatically moving said cursor to near the center of an object when the cursor moves into the pre-set area defined around said object corresponding to the data entry means being utilized to enter data; and executing the pre-set processing defined for the object when said cursor is positioned on said object and when data instructing the execution of the processing is entered to said information processing apparatus.

* * * * *